Nov. 8, 1955 T. R. SMITH ET AL 2,722,750
REMOVABLE LINT TRAP FOR CLOTHES DRIERS
Filed Feb. 18, 1952 2 Sheets-Sheet 1

INVENTOR.
Thomas R. Smith
BY Colby Weston Steward
Wilkinson Huxley Byron & Hume
ATTORNEY.

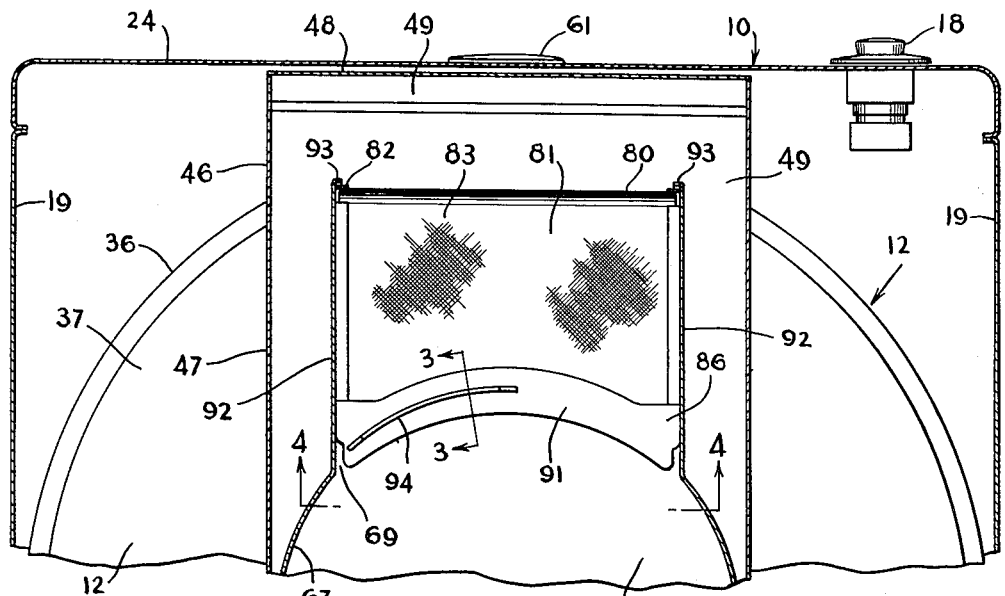
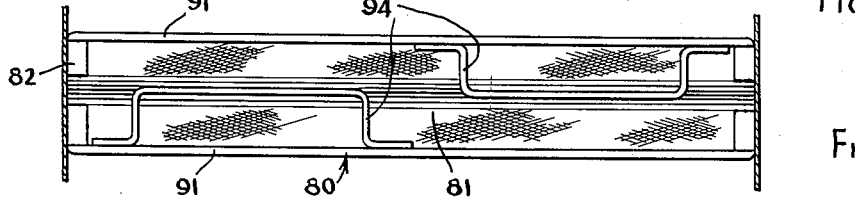
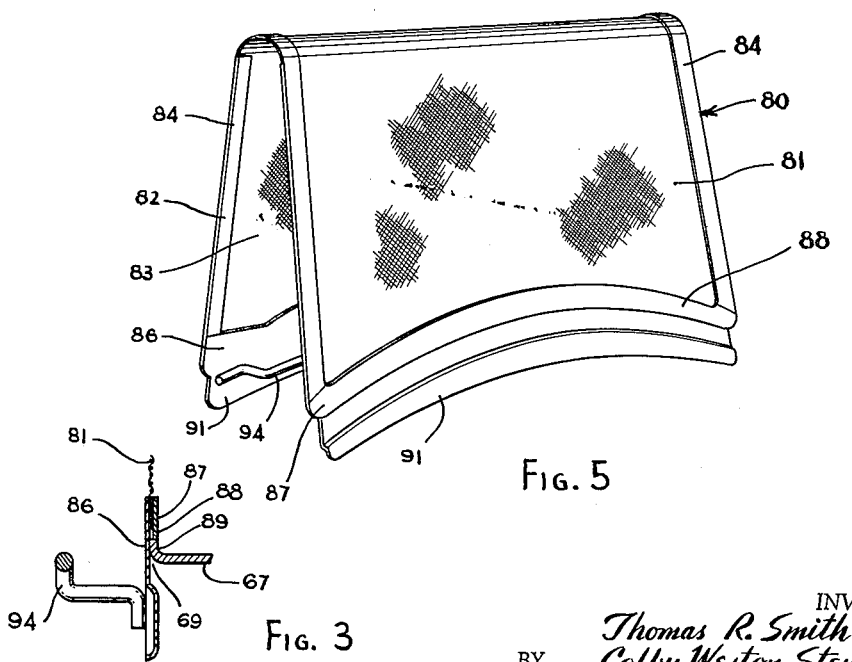

United States Patent Office 2,722,750
Patented Nov. 8, 1955

2,722,750

REMOVABLE LINT TRAP FOR CLOTHES DRIERS

Thomas R. Smith and Colby Weston Steward, Newton, Iowa, assignors to The Maytag Company, Newton, Iowa, a corporation of Delaware Application February 18, 1952, Serial No. 272,015

15 Claims. (Cl. 34—82)

The invention relates to lint traps and more particularly to removable lint traps for clothes driers. It is especially applicable to the type of drier disclosed in the companion application of Colby Weston Steward, Serial No. 272,016, filed February 18, 1952, for Fluid Conductor and Lint Collector for Clothes Driers.

It is among the objects of the invention to provide a simplified removable lint trap construction for a clothes drier which presents a relatively large filtering area to the air and vapor passing therethrough and to use the supporting frame for the screen as a part of the latching means to hold the trap in place.

Although the use of lint traps in clothes driers is standard practice, they are usually placed at the exit end of the duct work leading from the drying chamber, or at some intermediate point between the discharge end of the duct and the drying chamber. One of the undesirable characteristics of lint is that it readily collects or surfaces and in corners, consequently the duct work soon or eventually becomes coated or clogged at some point ahead of the trap. This, of course, in most instances will require a service call in order to put the drier in condition again for efficient operation.

In accordance with the present invention, the heated air, vapor and airborne lint leaving a clothes drier passes through a duct in the usual manner for eventual discharge to some remote point; however, a removable trap to collect or filter out the lint is placed in the inlet of the duct and is insertable and removable through the access opening in the cabinet when the door is in its open position. When the location of the trap is in the entrance of the duct all of the vapor must pass through the screen to filter out the lint to prevent the same from collecting in the duct to thereby eliminate the above mentioned difficulty.

It is, therefore, another object of the invention to provide a clothes drier with a removable lint trap in the inlet of the duct leading from the drying chamber.

It is yet another object of the invention to provide a clothes drier with a removable lint trap disposed between the vapor discharge side of the drier and the inlet of the vapor conducting duct.

It is yet another object of the invention to provide a clothes drier with an access opening communicating with a vapor conducting passage which has a removable lint trap adapted to be carried in the inlet of the passage and insertable and removable through the access opening to the drier.

It is another object of the invention to provide a lint trap for a clothes drier which utilizes the frame of the trap and a portion of the duct to hold the same in position.

It is still another object of the invention to provide a clothes drier with a lint trap which is mounted in an inverted position with means for preventing large accumulations of lint from falling out of the confines of the trap and back into the drying chamber.

Other objects, features, capabilities and advantages are comprehended by the invention as will later appear and as are inherently possessed thereby.

Referring to the drawings:

Figure 2 is a partial vertical transverse sectional view taken along the line 2—2 of Figure 1 showing the improved lint trap;

Figure 3 is an enlarged partial sectional view of the lint trap taken on the line 3—3 of Figure 2;

Figure 4 is a horizontal sectional view of the lint trap taken on the line 4—4 of Figure 2; and, Figure 5 is a perspective view of the improved lint trap.

Figure 1:
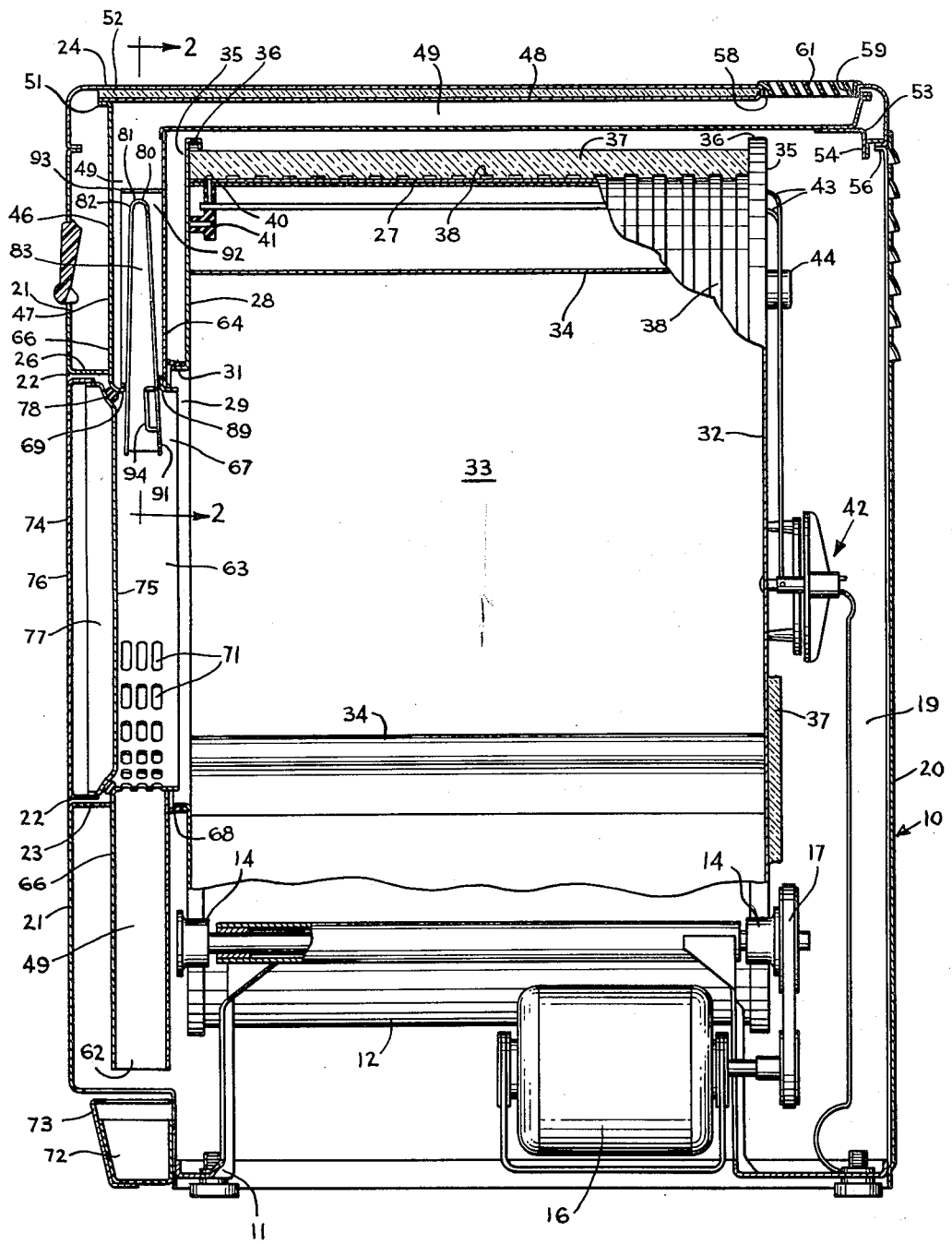
Figure 1 is a partial longitudinal vertical sectional view of a clothes drier and vapor conducting passage with the improved lint trap applied thereto.

Referring now more in detail to the drawings for one form of clothes drier embodying the features of the present invention, there is shown an outer cabinet 10 secured to a base or frame structure 11 for completely enclosing the operating parts of the clothes drier. The base 11 further provides a support for a hollow clothes receiving rotatable tumbler or drum 12 mounted for rotation about a horizontal axis within a supporting cradle by four spaced hard rubber rollers 14, and it is rotated by means of a pivotally mounted electric motor 16 through any suitable belt and pulley speed reduction arrangement 17. The drier further includes control mechanism 18, the details of which are not shown, for automatically controlling the operation of the drying cycle.

The cabinet 10 has its main body portion formed with side panels 19, a louvred back panel 20 for permitting flow of cooling air about the drive motor 16, a front panel 21 having a substantially centrally located square access opening 22 therein with an inwardly directed flange or skirt portion 23 disposed about the horizontal axis of the drum 12 whereby the operator may gain access to the interior of the drum, and a top panel 24 to provide a substantially rectangular unitary structure.

The horizontally mounted drum or tumbler 12 within the casing 10 comprises an imperforate cylindrical wall 27 disposed between a vertical front wall or header 28, having a single centrally located access opening 29 with an outwardly directed cylindrical flange 31 facing the opening 22 in the front panel 21, and a vertical imperforate rear wall or header 32 spaced in parallel relation to the front wall. All three elements are welded or secured together, in any suitable manner, to form a unitary rigid structure to define a drying chamber 33 therein. A plurality of parallel, horizontal and radially inwardly directed clothes lifting ribs or elevating vanes 34 are secured to the inner periphery of the cylindrical wall 27 for agitating the clothing being dried. Each of the walls 28 and 32 has identical flange portions 35 extending radially outward beyond the outer periphery of the cylindrical wall 27 which are rolled to form flat horizontal cylindrical supporting surfaces or ribs 36 adapted to rest on the rollers 14 to provide the sole supporting means for holding the drum in its horizontal position. The drum may be provided with suitable insulation 37 to improve the over-all efficiency of the drier.

In order to evaporate the moisture in the clothing within the drum, heat must be applied thereto. In the drier herein disclosed the means for heating the drum is in the form of an electrical heating element 38 formed by a single flat, long, thin and relatively wide strip tightly wound over a thin layer of electrical insulation in an open spiral to cover substantially the entire outer periphery of the imperforate cylindrical wall 27. The opposite or free ends 40 of the heating element are secured to suitable terminal posts 41 disposed in the recess provided by one of the ribs 34. The means for energizing the heating element includes a collector ring assembly 42 having the usual brushes and slip rings mounted on the rear wall 32 of the drum in any suitable manner, and it is connected to a source of electrical energy and to two conductors 43 leading to the terminal posts 41 of the heating element 37. One of the conductors 43 is connected in series with a temperature responsive thermostat or limit switch 44 secured to the rear wall 32 of the drum adjacent its inner periphery 27 which acts to de-energize the heating element whenever the temperature within the drying chamber 33 reaches or tends to exceed a predetermined safe value. A heating element of this type uniformly heats the entire periphery of the drum, which, of course, heats the clothing in the drying chamber to drive off the moisture or a high percentage thereof, and the over-all temperature of the entire heating element is reduced considerably.

Referring now more particularly to Figure 1, it can be seen that the front header or wall 28 and the rims 36 of the drum 12 are spaced from the cabinet's front and top panels or walls 21 and 24, respectively, to provide room for receiving an open-ended fluid conducting, inverted L-shaped rectangular duct or conduit 46, having a vertical front section 47 with parallel walls and a rearwardly extending top horizontal section 48 for providing a fluid conducting passage 49. The upper end 51 of the vertical section 47 is secured to the front portion 52 of the horizontal top section 48 to provide a unitary structure. This inverted L-shaped duct is held in spaced relation to the cabinet and drum by means of a rear bracket 53 secured by screws or the like to an inturned flange 56 carried by the top panel 24 and to brackets or wings (not shown) formed about the opening 22 adjacent the inner end of the skirt 23 on the front panel 21.

In addition, the horizontal section 48 of the duct has an opening 58 of any suitable configuration adjacent its rearmost point with an upstanding flange thereon adapted to fit within a downwardly directed flange formed about a mating discharge opening 59 provided at the rear central portion of the top wall 24 of the drier cabinet. If desired, a removable louvred grill 61 is adapted to fit within the opening 59 to direct the heated air and vapor in a forward direction into the ambient atmosphere and at the same time provide a pleasing appearance to the exterior of the cabinet. The vertical section 47 of the duct 46 has a lower open end 62 disposed adjacent the lower portion of the front panel 21 of the cabinet and is in direct communication with the relatively cool air adjacent the base 11 within the confines of the cabinet.

Intermediate the lower and upper ends of the vertical section 47 of the duct and in alignment with the aligned access openings 22 and 29 in the front wall 21 of the cabinet and the front wall 28 in the drum, respectively, the duct is provided with a short horizontal cylindrical passage 63 of approximately the same size as the access opening 29 in the drum. This passage is formed in any suitable manner, such as for example, by cutting an opening in the back wall 64 of the vertical duct 47 and punching a similar opening in its front wall 66 with a drawn cylindrical collar or portion 67 extending toward and overlapping a portion of the outwardly directed flange 31 about the access opening 29 in the front wall of the drum. It is to be understood, of course, that any suitable alternate construction may be incorporated at this point. The cylindrical portion 67 prevents articles of clothing from falling into the vertical passage 49 when they are being inserted or removed from the drying chamber 33, and when the clothing is being tumbled during the drying operation. An annular ring 68 of sealing material is clamped on the outer periphery of the outwardly projecting flange 31 and it has a forwardly projecting edge for engaging the rear wall 64 of the duct to provide a rotating seal to restrict the flow of vapor and lint into the interior of the cabinet.

In order to provide means for connecting the drying chamber 33 with the ambient atmosphere and to allow the vapor evaporated from the clothing to escape, the upper portion or sector of the horizontal cylindrical passage 63 is provided with a relatively large rectangular slot 69 directly communicating with the upper portion of the vertical duct, and the lower portion or sector of the cylindrical passage is provided with a series of relatively large perforations 71 in direct communication with the lower portion of the duct. While, during the drying operation a relatively large percentage of the air entering the lower open end 62 of the vertical portion of the duct flows upwardly through the perforations 71, they also provide a means for permitting the heavy lint thrown through the opening 29 and the vapor condensed in this space to pass therethrough and fall downwardly out of the open end 62 of the duct, to be collected or caught in a detachable combination heavy lint and moisture collecting tray or trap 72 disposed directly therebelow.

It is to be noted the lower open end 62 of the vertical duct 46 terminates short of the inturned end of the front panel of the cabinet and a detachable toeboard 73 carrying the tray 72 is spaced therefrom to provide clearance for the flow of air into the fluid conducting passage 49.

To insure the proper direction of flow of the air and vapor discharged from the drum and to prevent the tumbling clothing from being thrown out of the access opening 22 in the cabinet, an imperforate closure or door 74 is mounted therein. This door is generally square in front plan and hinged to pivot about a vertical axis, and is provided with the usual handle or grip device to permit the operator to grasp the same to open or close the door at will. The door is constructed with inner and outer panels 75 and 76, respectively, with their major portions separated to provide an insulating space 77 and a rubber or suitable gasket 78 is carried on the inner panel 75 to contact and seal against the duct 47 about the cylindrical passage 63.

While the heavy lint leaving the drying chamber 33 and condensed vapor pass through the large perforations 71 into the lower vertical portion of the passage and are safely directed into the collecting tray 72, the light airborne lint will travel with the vapor and heated air upwardly through the duct 46, and unless filtering means are provided, it will enter the ambient atmosphere and settle on a major portion of the surrounding surfaces and at the same time a portion of the lint will collect and accumulate in the duct work and eventually clog or restrict the flow of vapor discharged from the drying chamber. This fine, airborne lint is a particularly vexing problem on all types of driers, especially so with driers employing air motivating fans which force large quantities of air through the drum during the drying operation, even when lint traps of various types are utilized, because lint with its inherent tendency to collect in the ducts will tend to clog the conducting passages.

Accordingly, in order to overcome the airborne lint problem, a lint trap 80 is detachably mounted in the rectangular slot 69 provided in the cylindrical collar 67 which forms the entrance to the upper portion of the vertical section 47 from the drying chamber 33. The lint trap shown is adapted to be inserted and removed from the slot 69 through the access opening 22 when the door 74 is in its open position.

The lint trap comprises an inverted V- or U-shaped fine mesh screen 81 to present as large an area to the fluid flow as possible and is held in this shape by means of a resilient open frame construction 82. The upper portion or end and sides of the trap are closed to define a lint collecting chamber 83 while the lower portion or end is open to permit air, vapor and lint to enter the same. The frame construction 82 includes a pair of opposite similar U-shaped resilient reinforcing side channels or strips 84 for securely clamping the sides of the screen and for expanding the free ends or edges in an opening direction. A pair of spaced supporting edge or end strips having inner and outer sections 86 and 87, respectively, for securing and reinforcing the spaced free ends of the screen are arcuate to conform to the circumference of the cylindrical collar or portion 67. In addition, the lower edge 88 of each outer section 87 of the end strips cooperates with its inner section 86 to provide opposite latch or catch surfaces which, when placed in position, are adapted to snap over and engage the top surface of a radially extending flange 89 formed on the front and back of the rectangular slot 69 to thereby prevent the lint trap from being accidentally displaced or from falling out of position. An arcuate shaped skirt or grip element 91, which may be formed as an integral portion of each of the inner sections 86 of the end strips, extends downwardly into the horizontal passage 67 a short distance when the screen is in position and the vapor and lint must pass between the spaced grip members as it enters the collecting chamber.

Disposed within the upper portion of the vertical passage 49 are a pair of spaced upwardly directed imperforate vertical walls 92 which engage the opposite side channels 84 at the sides of the screen to guide the screen and at the same time provide a seal at the side channels 84 to prevent bypassing of lint around the screen. Also, the upper ends of the walls 92 have inturned flanges 93 which provide stops to limit upward movement of the lint trap during insertion.

In order to remove the lint trap 80 for cleaning, after the drying operation, the operator merely reaches through the access opening 22, grasps the spaced grip elements 91 and compresses the same. This moves the open ends of the frame 82 so that the catch surfaces 88 slide away from the upturned flanges 89 and then the operator pulls the lint trap downwardly until it clears the duct and removes the same out of the access opening 22. After cleaning, the procedure for inserting the lint trap is reversed. Should the operator fail to clean the lint trap for a period of time, portions of the accumulated lint may tend to slide or roll off the inverted screen in the general form of a light ball or a wad and fall out of the lower open end of the screen; therefore, a pair of inwardly directed bent lint retaining members or bars 94 are secured to the inner sides of the inner sections 86. These bars are relatively thin and widely spaced and do not interfere with the flow of vapor and lint into the lint collecting chamber during normal operation, their main function being to hold any wads of lint falling from the screen within the confines of the collecting chamber 83 and to prevent or retard it from falling back into passage 63 or onto the fabrics being dried.

Thus, it can be seen that as the heated air, vapor and airborne lint first enters the lower open end of the lint trap 80 and travels or flows upwardly, a relatively large screen area is presented which prevents the passage of lint therethrough and collects the same on the under or inside of the screen 81. Also, since the air and vapor are merely rising by means of natural convection currents and the vapor pressure produced in the imperforate drum and only a very low pressure is involved, the tendency for the lint to pack and be matted on the screen and choke off the flow of fluid through the same is, for all practical purposes, eliminated. Due to the very loose accumulation of lint on the screen without packing or matting, the initially collected lint acts in effect as a filter for the later arriving lint and it has a tendency to improve the filtering action and at the same time offers very little or no resistance to the flow of air and vapor therethrough.

In addition, it can be seen that a tumbler type clothes drier has been provided which provides an effective means for collecting the airborne lint prior to its entry into the duct work leading from the clothes drier and that this screen is relatively simple in construction and is insertable and removable through the access opening in the cabinet. Also, that means are provided for retarding large accumulated quantities of lint from falling back into the clothes drying chamber.

While I have herein described and upon the drawings shown an illustrative embodiment of the invention, it is to be understood that the invention is not limited thereto but may comprehend other constructions, arrangements of parts, details and features without departing from the spirit of the invention.

What is claimed is:

1. In a lint trap for a clothes drier having a heated drying chamber for receiving the moist fabrics to be dried, the combination of a duct leading from chamber to a remote location, and a lint trap carried in said duct adjacent said chamber, said trap comprising a pair of resilient inverted U-shaped frames, a U-shaped screen secured to said side frames with spaced ends defining a lower entrance to said trap, a pair of cross frames for supporting the spaced ends of said screen and having means providing a catch for engaging said duct for holding said screen in position, and grip members secured adjacent said entrance for moving the open end of said trap in a closing direction to release the catch from said duct to permit the removal of said trap from said duct.

2. In a tumbler type clothes drier, the combination of a duct leading from said drier, a removable lint trap carried in said duct, said trap including an inverted U-shaped lint collecting screen having its lower ends spaced for permitting the entrance of lint into the interior thereof, a resilient frame for supporting the outer perimeter of said screen, grip means on said frame for moving the said edges toward each other to permit removal of said trap from said duct, and means including spaced bars carried by said frame adjacent said open end of said screen for retaining within said trap larger accumulations of lint falling from said screen.

3. In a tumbler type clothes drier, the combination of a duct having a vertical portion in communication with said drier, a lint trap for said drier mounted in the vertical portion of said duct, said trap including an inverted U-shaped lint collecting screen having its ends spaced for permitting the entrance of lint into the interior thereof to accumulate therein, a resilient frame for supporting the outer perimeter of said screen, grip means on said frame for moving the said ends toward each other, and means including spaced bars carried by said frame adjacent said lower open end for intercepting larger accumulations of lint tending to fall from the interior of said trap.

4. In a tumbler type clothes drier having a drying chamber, the combination of a duct having a vertical portion in direct communication with said drying chamber, a lip provided on opposite sides of said duct, a removable lint trap carried in the vertical portion of said duct, said trap including an inverted U-shaped screen having its ends spaced for permitting the entrance of airborne lint into the interior thereof to accumulate therein, a resilient frame construction for supporting said screen and for urging said ends in an opening direction to engage said lips to latch said trap in position, grip members carried by said frame adjacent said edges for moving the same in a closing direction to unlatch said trap from said duct for removal, and spaced members carried by said frame across the lower open end of said screen for permitting the entrance of airborne lint into the interior thereof but to retain any larger accumulations of lint tending to pass out of the open end of said screen.

5. A tumbler type clothes drier having a drying chamber and an access opening to said chamber, a duct having a vertical portion extending upwardly from said access opening, and in direct communication with said chamber, a closure for said access opening, a removable lint trap insertable and removable in an inlet to said duct through said access opening, said lint trap including an inverted U-shaped screen having its ends spaced for permitting entrance of airborne lint into the interior thereof to accumulate therein, a resilient frame construction for supporting said screen and for urging the ends in an opening direction, said frame engaging said duct to latch said lint trap in position, grip members carried by said frame adjacent said ends for moving the same in a closing direction to unlatch said trap for removal from said duct, and spaced members carried by said frame across the open end of said screen for permitting the entrance of airborne lint into the interior thereof but for retarding any larger accumulations of lint tending to pass out of the open end of said screen.

6. A tumbler type clothes drier having a drying chamber, a cabinet surrounding said drying chamber and having an access opening in communication with said chamber, a closure for said access opening, a duct having a vertical portion with an entrance extending upwardly from said access opening and in communication with said chamber, a pair of upwardly extending guides in said duct adjacent said entrance, a removable lint trap insertable and removable in the entrance to said duct through said access opening and including an inverted U-shaped screen having its lower ends spaced to permit the entrance of airborne lint therein, a resilient frame construction for supporting said screen including side portions for contacting said guides and sealing said trap and arcuate end portions, said arcuate end portions supporting the spaced ends of said screen and providing a latch for engaging said duct, arcuate grip members formed integral with said end portions for moving the same in a closing direction to release said latch to permit the removal of said trap from said duct, and spaced members secured on the inner side of said arcuate end portions adjacent said open end to provide no resistance to the airborne lint entering the interior of said trap, but capable of restricting larger accumulations of lint tending to fall out of the open end of said screen.

7. A lint trap for a clothes drier, comprising an inverted U-shaped screen bounded upon its opposite vertical sides by a pair of resilient inverted U-shaped frames, opposed legs of said frames being connected across the ends of said screen by cross members which secure the screen and define the entrance to said trap, said members normally being held in essentially parallel spaced relation by said frames and being displaceable toward each other against the resilient bias of the latter.

8. The invention of claim 7, wherein said members along their opposed lower portions are provided with gripping means for moving them along with the attached spaced ends of the screen in a closing direction.

9. The invention of claim 8, in which said members each have an offset shoulder extending outwardly of the inverted U-shaped screen assembly constituting catch surfaces for holding the trap in operative position in a drier.

10. The invention of claim 9, said members being further provided with inwardly projecting means partially obstructing the entrance of said trap for preventing accumulations of lint in the trap from falling therefrom.

11. The invention of claim 10, said inwardly projecting means comprising spaced bars mounted parallel to said members, one of said bars being projected from and secured to one of said members, the other bar being projected from and secured to the other of said members.

12. In a tumbler type clothes drier, the combination of a fluid conducting duct in communication with said drier for conducting vapor and lint therefrom, and a lint trap in said duct in accordance with claim 7.

13. In a tumbler type clothes drier, the combination of a fluid conducting duct in communication with said drier for conducting vapor and lint therefrom, and a lint trap in said duct in accordance with claim 10.

14. In a clothes drier having a drying chamber and a duct leading from said chamber for conducting vapor and lint from said chamber, a lint trap comprising a U-shaped screen bounded upon two of its opposite sides by a pair of resilient U-shaped frames, cross members between said frames securing said screen to said frames and defining an entrance to said trap, said cross members being displaceable towards each other against the resiliency of said frames and adapted to engage said duct in a close fitting relationship.

15. The invention of claim 14, in which said cross members are provided with inwardly projecting means partially obstructing the entrance of said trap for retaining fallen accumulations of lint from said trap.

References Cited in the file of this patent

UNITED STATES PATENTS

| | | |
|---|---|---|
| 165,930 | Irving | July 27, 1875 |
| 1,388,347 | Klicka | Aug. 23, 1921 |
| 1,746,283 | Reed et al. | Feb. 11, 1930 |
| 2,226,630 | McCord | Dec. 31, 1940 |
| 2,293,432 | Friedman | Aug. 18, 1942 |
| 2,486,058 | Patterson et al. | Oct. 25, 1949 |
| 2,550,319 | Wright | Apr. 24, 1951 |